United States Patent [19]

Wang

[11] 4,010,305

[45] Mar. 1, 1977

[54] LAMINATES OF PLASTICIZED PVC AND ACRYLONITRILE: ALKYL ACRYLATE COPOLYMERS

[75] Inventor: Jin-Liang Wang, Akron, Ohio

[73] Assignee: The Goodyear Tire & Rubber Company, Akron, Ohio

[22] Filed: Mar. 31, 1975

[21] Appl. No.: 563,756

[52] U.S. Cl. .............................. 428/215; 156/331; 156/333; 427/407 F; 428/332; 428/334; 428/335; 428/339; 428/420; 428/424; 428/425; 428/518; 428/520; 428/522

[51] Int. Cl.² .................. B32B 7/10; B32B 27/22; B32B 27/26; B32B 27/30

[58] Field of Search .......... 428/215, 332, 334, 335, 428/339, 420, 424, 425, 518, 520, 522; 427/407; 156/331, 333

[56] References Cited

UNITED STATES PATENTS

| | | | |
|---|---|---|---|
| 3,194,725 | 7/1965 | Pounds | 428/520 X |
| 3,505,105 | 4/1970 | MacFarlane | 427/407 X |
| 3,616,187 | 10/1971 | Ottmann | 428/425 X |
| 3,676,410 | 7/1972 | Bauer | 260/80.81 |

*Primary Examiner*—Dennis L. Albrecht
*Attorney, Agent, or Firm*—F. W. Brunner; J. D. Wolfe

[57] ABSTRACT

A method of making a composition useful for making a copolymer laminate with polyvinyl chloride. The copolymer is an alkyl acrylate or alkyl methacrylate where the alkyl group contains 1 to 30 carbon atoms and vinyl nitrile. Improved adhesion is achieved when 1 to 50 parts of organic isocyanate or polyisocyanate is used per 100 parts of polyvinyl chloride (or 100 parts of copolymer) where the polyvinyl chloride contains high amounts of plasticizer.

4 Claims, No Drawings

LAMINATES OF PLASTICIZED PVC AND ACRYLONITRILE: ALKYL ACRYLATE COPOLYMERS

This invention relates to copolymers having improved adhesive properties and to the method of making said copolymers and their laminates.

Polymers of acrylate and methacrylate/vinyl nitrile are transparent and have useful properties for forming films by casting from solutions, calendering or extrusions. Unfortunately, these compositions have poor adhesion to polyurethane, polyvinyl chloride and metals of steel, aluminum, copper, etc. and thus laminates of these cannot be readily made. The film laminates are very desirable for outdoor usage.

An object of this invention is to provide a method of adhering copolymers of acrylate or methacrylate/vinyl nitrile to highly plasticized polyvinyl chloride by incorporating organic isocyanate or polyisocyanate into polyvinyl chloride and/or copolymer.

The advantages of this invention can be readily obtained by preparing a copolymer of an acrylate or methacrylate/vinyl nitrile and then using the copolymer alone or in combination with an organic isocyanate or polyisocyanate to form a laminate with a highly plasticized polyvinyl chloride which contains an organic isocyanate or polyisocyanate.

The composite of this invention comprises two materials adhered together in the presence of 1 to 50 parts of an isocyanate composition, said materials being polyvinyl chloride containing 20 to 100 parts of plasticizer per 100 parts of polyvinyl chloride and a copolymer of vinyl nitrile with alkylacrylate or alkyl methacrylate where the alkyl group contains 1 to 30 carbon atoms, said isocyanate composition being present in at least one of the materials, preferably polyvinyl chloride.

The nature of this invention can be more readily appreciated by reference to the representative and exemplifying examples where all parts and percentages are by weight unless otherwise indicated.

EXAMPLE I

A copolymer containing 60/40 percent 2-ethylhexyl acrylate/acrylonitrile was made by dissolving 60 percent 2-ethylhexyl acrylate (sometimes called 2-EHA) and 40 percent acrylonitrile (sometimes called AN) in methyl ethyl ketone and initiating polymerization at 60° C. with t-butyl peroxypivalate and allowing polymerization to continue to yield 50 percent solids with high conversion. This copolymer had an intrinsic viscosity of 0.6 in dimethylformamide at 30° C. The 50 percent copolymer solution was diluted with sufficient tetrahydrofuran to give 19 percent by weight copolymer solution. A commercial polyvinyl chloride (sometimes called PVC) milled with 22.8 parts diisooctyl phthalate, 4.1 parts epoxy soya oil (Paraplex G-62), 5.7 parts tricresyl phosphate and 7.4 parts N-octyl N-decyl phthalate plasticizers to give 40 parts plasticized PVC composition. Besides these, the common recipe included in PVC was: 1.0 part 2-hydroxy-4-n-octoxy benzophenone, as a UV stabilizer, 2.6 parts Advastab BC 103A (liquid barium cadmium zinc stabilizer for PVC), 1.5 parts Mark C (alkyl aryl phosphate complex, a PVC stabilizer), 0.01 part Purplic (chipped dispersion of oil violet 1%, a color hidden agent) and 0.6 part triple pressed stearic acid (a lubricant). This highly plasticized PVC sample was dissolved in tetrahydrofuran to give 19% PVC solution.

The organic isocyanate for polyisocyanate when used was dissolved in the polymer solutions before casting.

This 19 percent PVC solution was used to cast a film on a clean glass plate and drawn down with a casting knife of scale 75 to give a film of thickness shown in Table I after drying in forced air hood overnight.

A second film was cast on the glass plate by casting the 19 percent copolymer solution over the PVC film. The second film was drawn down with a casting knife having a scale of 22 to give a second film of 2 mil after drying in forced air hood for two hours. This laminated film was then completely dried in oven at 77° C. for 5 hours.

The physical properties before and after 5000 hours xenon-arc Weatherometer exposure on these film laminates are shown in Table I.

Table I

| | PHYSICAL PROPERTIES OF LAMINATED FILMS | | | | | | | | |
|---|---|---|---|---|---|---|---|---|---|
| | Desmodur N-75** content parts | | Thickness, Mils | | Initial Unexposed | | | 5000 hours Exposure*** | | |
| Sample No. | First* Film | Second* Film | First* Film | Second* Film | Modulus, psi at 100% | Tensile Strength psi | Ultimate Elongation, % | Modulus psi at 100% | Tensile Strength psi | Ultimate Elongation, % |
| 1 | 11 | 7.5 | 9.8 | 1.7 | 2130 | 3090 | 310 | 2450 | 3070 | 260 |
| 2 | 22 | 0 | 11.2 | 1.7 | 2270 | 3150 | 290 | 2640 | 3360 | 280 |
| 3 | 22 | 15 | 11.2 | 2.6 | 2270 | 3100 | 300 | 2560 | 3230 | 260 |
| 4 | 33 | 0 | 12.6 | 3.1 | 2450 | 2620 | 230 | 2700 | 2730 | 140 |
| 5 | 33 | 22.5 | 12.6 | 3.5 | 2600 | 2710 | 190 | 2910 | 3050 | 210 |

*First film was PVC plus 40 parts plasticizer and the second film was a 60/40 - 2EHA/AN copolymer.
**A tradename for a commercial organic polyisocyanate of the aliphatic type.
***The second film in the laminate face the xenon-arc light for exposure.

The laminated films possessing strong adhesion, excellent tensile strength and ultimate elongation are the films having PVC with higher plasticizer and aliphatic polyisocyanate content and copolymer with or without lower level of polyisocyanate. Further variations on all these components are possible. These include other types of polymeric isocyanates, various plasticizers and their levels in PVC and various alkyl acrylates and alkyl methacrylates and various vinyl nitriles such as methacrylonitrile and ethacrylonitrile.

The film thickness of copolymer and PVC which make up the laminated film can be varied. The preferred ones are 2 mils for copolymer and 10 mils for PVC.

Techniques suggested for preparation of copolymers include solution, bulk, emulsion and suspension. Initiators include all the initiators used for free radical polymerization such as organic peroxides, hydroperoxides, azo or diazo compounds, persulfates, redox systems, etc. In addition, PVC and copolymer laminates can be coextruded using proper equipment and conditions.

The copolymers useful in this invention preferably contain from 45 percent to 70 percent of 2-ethylhexyl acrylate, 30 percent to 55 percent of acrylonitrile, the percentages being by weight.

The organic polyisocyanates useful in this invention are any of the aliphatic, cycloaliphatic and aromatic mono, di and triisocyanates and their adducts with polyols.

Representative examples of these organic isocyanates useful for imparting adhesiveness between highly plasticized PVC and copolymers of this invention ae toluene diisocyanate, methylene-bis(phenyl isocyanate), (MDI), toluidine diisocyanate, isophorone diisocyanate, phenyl isocyanate, polyphenyl methane polyisocyanate, hydrogenated MDI, cyclohexyl diisocyanate or those polymeric polyisocyanates and the others well known to the polyurethane chemist. Examples of the polymeric polyisocyanates are those available under tradenames such as Mondur 75 or Desmodur N-75 or PAPI.

Use of the aliphatic isocyanates or aliphatic polyisocyanates as shown in Example I is particularly desirable where sunlight protection is desirable. Also the copolymers give enhanced resistance to dirt accumulation. The amount of organic isocyanate used to treat the polymers can vary from 1 to 50 or more parts per hundred with the preferred range being 5 to 25 parts.

Where the PVC polymers are plasticized, the use of the organic isocyanate is particularly advantageous. For instance, at high plasticizer levels, viz. 30 to 100 parts per hundred PVC, the isocyanate levels, viz. 10 to 30 parts are quite satisfactory. Thus, this invention produces laminates having better service life than the single polyvinyl chloride film, as the single polyvinyl chloride film has undesirable properties in regard to high temperature creep resistance, low temperature stiffness and dirt pick-up from its tacky surface.

While certain representative embodiments and details have been shown for the purpose of illustrating the invention, it will be apparent to those skilled in this art that various changes and modifications may be made therein without departing from the spirit or scope of the invention.

What is claimed is:

1. A composite consisting of a polyvinyl chloride containing 20 to 100 parts of plasticizer and one to 50 parts of a polyisocyanate composition for each 100 parts of polyvinyl chloride adhered to a copolymer of 60 to 30 parts of acrylonitrile and 40 to 70 parts of alkylacrylate or alkyl methacrylate where the alkyl radical contains 1 to 30 carbon atoms.

2. The composition of claim 1 wherein the copolymer is the reaction product of 2-ethylhexylacrylate and acrylonitrile.

3. The composite of claim 1 wherein the polyvinyl chloride is present as a film 5 to 30 mils thick and the copolymer is present as a film 1 to 10 mils thick.

4. The composite of claim 1 wherein the isocyanate composition is an aliphatic or cycloaliphatic polyisocyanate.

* * * * *